United States Patent [19]
Austin et al.

[11] Patent Number: 5,415,925
[45] Date of Patent: May 16, 1995

[54] GAMMA STRUCTURE COMPOSITE NONWOVEN FABRIC COMPRISING AT LEAST TWO NONWOVEN WEBS ADHESIVELY BONDED BY A LIGHTWEIGHT ADHESIVE WEB

[75] Inventors: Jared A. Austin, Greer; Mark H. S. Berman, Simpsonville; Raymond A. Dunleavy, Greer, all of S.C.

[73] Assignee: Fiberweb North America, Inc., Simpsonville, S.C.

[21] Appl. No.: 896,323

[22] Filed: Jun. 10, 1992

[51] Int. Cl.$^6$ .......... B32B 27/34; B32B 5/06; B32B 27/36
[52] U.S. Cl. .......... 428/287; 428/284; 428/302; 428/303; 428/373
[58] Field of Search .......... 478/284, 286, 287, 296, 478/298, 301, 302, 303, 373

[56] References Cited

U.S. PATENT DOCUMENTS

| | | |
|---|---|---|
| 3,607,543 | 9/1971 | Stevenson et al. |
| 3,770,562 | 11/1973 | Newman. |
| 3,795,571 | 3/1974 | Prentice .......... 428/296 |
| 4,041,203 | 8/1977 | Brock et al. |
| 4,287,251 | 9/1981 | King et al. |
| 4,374,888 | 2/1983 | Bornslaeger .......... 428/284 |
| 4,436,780 | 3/1984 | Hotchkiss et al. |
| 4,511,615 | 4/1985 | Ohta. |
| 4,555,811 | 12/1985 | Shimalla .......... 428/284 |
| 4,610,915 | 9/1986 | Crenshaw et al. .......... 428/219 |
| 4,766,029 | 8/1988 | Brock et al. |
| 4,818,585 | 4/1989 | Shipp, Jr. |
| 4,818,597 | 4/1989 | DaPonte et al. .......... 428/284 |
| 4,822,666 | 4/1989 | Hudson. |
| 4,863,785 | 9/1989 | Berman et al. |
| 5,037,409 | 8/1991 | Chen et al. .......... 604/358 |
| 5,041,483 | 8/1991 | Burch. |
| 5,061,261 | 10/1991 | Suzuki et al. .......... 604/325.2 |
| 5,176,952 | 1/1993 | Joseph et al. .......... 428/284 |

FOREIGN PATENT DOCUMENTS

| | | |
|---|---|---|
| 164739A3 | 12/1985 | European Pat. Off. |
| 392528A2 | 10/1990 | European Pat. Off. |
| 405793A2 | 1/1991 | European Pat. Off. |
| 416620 | 3/1991 | European Pat. Off. |

*Primary Examiner*—James D. Withers
*Attorney, Agent, or Firm*—Bell, Seltzer, Park & Gibson

[57] ABSTRACT

The invention is directed to a composite nonwoven fabric comprising a nonwoven web of spunbonded substantially continuous thermoplastic filaments, a nonwoven web of thermoplastic strands, and a nonwoven web of thermoplastic meltblown microfibers sandwiched between the nonwoven web of spunbonded substantially continuous filaments and the nonwoven web of thermoplastic strands. An adhesive agent is disposed between the nonwoven web of spunbonded filaments and the nonwoven web of meltblown microfibers and between the nonwoven web of thermoplastic strands and the nonwoven web of meltblown microfibers, adhering the respective nonwoven webs together to form a unitary composite nonwoven fabric. In a preferred embodiment, the composite nonwoven fabric of the invention comprises a nonwoven web of spunbonded substantially continuous polyamide filaments, a nonwoven web of polyamide strands, and a nonwoven web of polyethylene meltblown microfibers sandwiched between the nonwoven web of spunbonded substantially continuous filaments and the nonwoven web of strands.

18 Claims, 1 Drawing Sheet

GAMMA STRUCTURE COMPOSITE NONWOVEN FABRIC COMPRISING AT LEAST TWO NONWOVEN WEBS ADHESIVELY BONDED BY A LIGHTWEIGHT ADHESIVE WEB

FIELD OF THE INVENTION

The invention relates to nonwoven fabrics and to a process for producing nonwoven fabrics. More specifically, the invention relates to composite nonwoven barrier fabrics particularly suited for medical applications.

BACKGROUND OF THE INVENTION

Nonwoven barrier fabrics have been developed which impede the passage of bacteria and other contaminants and which are used for disposable medical fabrics, such as surgical drapes, disposable gowns and the like. For example, such barrier fabrics can be formed by sandwiching an inner fibrous web of thermoplastic meltblown microfibers between two outer nonwoven webs of substantially continuous thermoplastic spunbonded filaments. The fibrous meltblown web provides a barrier impervious to bacteria or other contaminants in the composite nonwoven fabric. Such composite fabric structures are known generally in the art as spunbond-meltblown-spunbond, or "SMS," fabrics. Examples of such fabrics are described in U.S. Pat. No. 4,041,203 and U.S. Pat. No. 4,863,785.

In the manufacture of this type of fabric, the respective nonwoven layers are thermally bonded together to form a unitary composite fabric. Typically, the thermal bonding involves passing the nonwoven layers through a heated patterned calender and partially melting the inner meltblown layer in discrete areas to form fusion bonds which hold the nonwoven layers of the composite together. Without sufficient melting and fusion of the meltblown layer, the composite fabric will have poor inter-ply adhesion. However, unless the thermal bonding conditions are accurately controlled, the possibility exists that the thermal bond areas may be heating excessively, causing "pinholes" which can compromise or destroy the barrier properties of the inner meltblown layer. Thus in practice, the thermal bonding conditions which are used represent a compromise between the required inter-ply adhesion strength on the one hand, and the required barrier properties which must be provided by the meltblown layer on the other.

The conventional SMS type barrier fabrics also have limitations in the types of sterilization procedures which can be used. For some applications, it is desired that the fabric or garment be sterilized in the final stages of manufacture by exposure to gamma radiation. For example, the fabric or garment may first be sealed in a protective package, and then exposed to gamma radiation to sterilize the package and its contents. However, sterilization by gamma irradiation has been found to be unsuitable for many of the known medical barrier fabrics. Some of the polymers conventionally used in such medical barrier fabrics, such as conventional grades of polypropylene for example, are especially sensitive to degradation by gamma irradiation. Fabrics produced from such polymers tend to lose strength over time, becoming brittle as a result of the gamma irradiation. Also, the instability of the polymers to the irradiation results in the generation of distasteful odors in the product which are unacceptable to the consumer.

Various attempts have been made to overcome these limitations. For example, efforts have been made to render the polypropylene polymers more stable to gamma irradiation, such as by incorporating certain additives in the polymer to reduce the amount of degradation. For example, U.S. Pat. No. 4,822,666 describes a radiation stabilized polypropylene fabric in which a long-chain aliphatic ester is added to the polymer. U.S. Pat. No. 5,041,483 discloses incorporating a rosin ester into the polypropylene to stabilize the polymer and reduce the tendency toward odor generation after gamma irradiation. However, the use of such additives adds expense to the manufacturing process. Further, polypropylene is difficult to render gamma-stable even with the use of additives or stabilizers.

It would therefore be advantageous to provide a fabric that provides a barrier to the transmission of contaminants and which retains its strength and does not create an unpleasant odor when sterilized in the presence of gamma radiation.

SUMMARY OF THE INVENTION

The present invention provides composite nonwoven fabrics having desirable barrier properties and which are stable to gamma irradiation. The composite nonwoven fabric of the invention includes a nonwoven web formed of spunbonded substantially continuous filaments stable to gamma radiation sterilization, a nonwoven web formed of continuous filaments or staple fibers stable to gamma radiation sterilization, and a nonwoven web of thermoplastic meltblown microfibers sandwiched between and bonded to these two webs. The webs are bonded using an adhesive disposed between the spunbonded web and the meltblown web and between the web of continuous filaments or staple fibers and the meltblown web. Since an adhesive is used for bonding the layers, the meltblown layer does not have to act as the bonding agent and does not have to be selected based upon its melting point and thermal bonding properties. Moreover, the composition of each layer of the composite fabric may be selected strictly for the intrinsic properties which it contributes to the composite. The polymers of the layers may have widely disparate melting or softening points.

In one specific embodiment, the gamma radiation sterilizable composite nonwoven fabric of the present invention comprises a nonwoven web of spunbonded substantially continuous polyamide filaments, a nonwoven web of polyamide strands (continuous filaments or staple fibers), and a nonwoven web of polyethylene meltblown microfibers sandwiched between the nonwoven web of spunbonded polyamide filaments and the nonwoven web of polyamide strands. An adhesive is disposed between the nonwoven web of spunbonded polyamide filaments and the nonwoven web of polyethylene meltblown microfibers and between the nonwoven web of polyamide strands and the nonwoven web of polyethylene meltblown microfibers to adhere the respective nonwoven webs together to form a unitary composite nonwoven fabric. The adhesive is preferably selected from the group consisting of styrene-isoprene block copolymers, styrene-butadiene block copolymers, ethylene vinyl acetate copolymers, acrylic esters, and polyolefin-based copolymers.

In another specific embodiment, the gamma radiation sterilizable composite nonwoven fabric of the invention comprises a nonwoven web of spunbonded substantially continuous filaments formed from a thermoplastic polymer having hydrophobic properties, a carded web comprising staple fibers having hydrophilic properties, and a nonwoven web of polyethylene meltblown microfibers sandwiched between the nonwoven web of spunbonded polyamide filaments and the carded web. An adhesive is disposed between the nonwoven web of spunbonded filaments and the nonwoven web of polyethylene meltblown microfibers and between the carded web and the nonwoven web of polyethylene meltblown microfibers to adhere the respective nonwoven webs together to form a unitary composite nonwoven fabric.

BRIEF DESCRIPTION OF THE DRAWINGS

The invention will be understood more fully from the detailed description which follows, and from the accompanying drawings, in which.

DETAILED DESCRIPTION OF THE INVENTION

Figure 1:
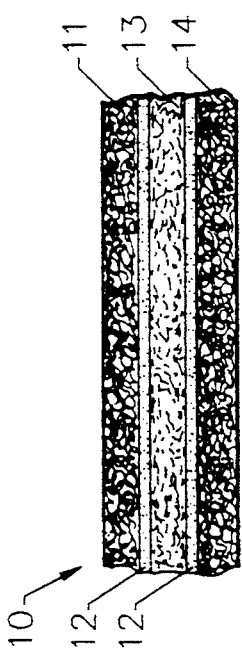
FIG. 1 is a diagrammatical cross-sectional view of a composite nonwoven fabric in accordance with the invention.

FIG. 1 is a diagrammatical cross-sectional view of a composite nonwoven fabric in accordance with one embodiment of the invention. The fabric, generally indicated at 10, is a three ply composite comprising an inner ply 13 sandwiched between outer plies 11 and 14. The composite fabric 10 has good strength, flexibility and drape and may be formed into various articles or garments such as surgical gowns, surgical drapes and the like. The barrier properties of the fabric 10 make it particularly suitable for medical applications, such as surgical gowns, but the fabric is also useful for any other application where barrier properties would be desirable.

Outer ply 11 of the composite fabric 10 is a nonwoven web of spunbonded substantially continuous thermoplastic filaments. The spunbonded web 11 may be produced using well known spunbonding processes, and may suitably have a basis weight in the range of about 10 to about 101 gsm. The thermoplastic filaments of ply 11 can be made of any of a number of known fiber forming polymer compositions which are stable to gamma irradiation. Such polymers include those selected from the group consisting of polyesters, such as poly(ethylene terephthalate), polyamides such as poly(hexamethylene adipamide) and poly(caproamide), polyethylene, and copolymers and blends thereof. Preferably, the continuous filaments of ply 11 comprise a polyamide polymer having a melting point of about 250° C. Polyamide is particularly preferred because of its cost and stability to gamma irradiation.

Outer ply 14 may be either a web of spunbonded substantially continuous thermoplastic filaments or a web of staple fibers. In the embodiment illustrated, ply 14 is a nonwoven web of spunbonded substantially continuous thermoplastic filaments of a composition and basis weight similar to outer ply 11. The continuous filaments or staple fibers of outer ply 14 are also formed of a composition which is stable to gamma sterilization irradiation, and may be selected from the same polymers as described above for ply 11. Additionally, the staple fibers may be natural or synthetic fibers having hydrophilic properties to give one surface of the composite fabric absorbent characteristics. Examples of hydrophilic fibers include cotton fibers, wool fibers, rayon fibers, acrylic fibers, and fibers formed of normally hydrophobic polymers which have been treated or chemically modified to render them hydrophilic. When ply 14 is a nonwoven web of staple fibers, the nonwoven web is a carded web or a wet-laid web of staple fibers. In one aspect of this embodiment of the invention, ply 14 is a nonwoven web comprising a mixture of thermoplastic staple fibers and absorbent staple fibers. The nonwoven web comprises the absorbent fibers in an amount sufficient to impart absorbency characteristics to the web.

As will be appreciated by those skilled in the art, polymers such as polyester and polyamide are particularly advantageous in the manufacture of plies 11 and 14 because these polymers have very good stability to gamma irradiation. However, polyolefins, such as polypropylene, may be employed in the manufacture of plies 11 and 14 as the sole polymeric component or as a component of a polymeric blend or bicomponent filaments, so long as the composition is gamma stable.

Inner ply 13 comprises a nonwoven fibrous web of meltblown thermoplastic microfibers. The microfibers preferably have an average fiber diameter of up to about 10 microns with very few, if any, of the fibers exceeding 10 microns in diameter. Usually the average diameter of the fibers will range from 2 to 6 microns. The meltblown microfibrous layer 13 is preferably manufactured in accordance with the process described in Buntin et al U.S. Pat. No. 3,978,185. The meltblown layer 13 may suitably have a basis weight in the range of about 10 to 80 gsm, and preferably in the range of about 10 to 30 gsm.

The thermoplastic polymer used to form the meltblown layer 13 is also preferably selected for its stability to gamma irradiation. The polymer may, for example, be selected from the group consisting of polyesters, such as poly(ethylene terephthalate), polyamides such as poly(hexamethylene adipamide) and poly(caproamide), polyethylene, polypropylene compositions which have been gamma stabilized, and copolymers and blends of the foregoing. In a preferred embodiment, the thermoplastic meltblown microfibers comprise linear low density polyethylene (LLDPE), prepared by copolymerizing ethylene and an alpha olefin having 3 to 12 carbon atoms. More preferably, the polymer is LLDPE having a melting point of about 125° C.

The plies 11, 13 and 14 are primarily bonded using an adhesive layer 12 disposed between adjacent plies. This preserves the structural integrity, and thus the barrier properties, of the meltblown layer 13. The adhesive is preferably a thermoplastic-based hot melt pressure sensitive adhesive which is tacky at room temperature. Suitable adhesives include block polymer rubbers, such as styrene-isoprene copolymers, styrene-butadiene copolymers, and the like; ethylene copolymers, such as ethylene vinyl acetate copolymers and the like; acrylic esters; polyolefin-based polymers, such as polypropylene- or polyethylene-based polymers, and the like.

The adhesive is applied lightly and substantially uniformly over at least one surface of adjacent webs. The adhesive agent can be applied in a continuous or discontinuous pattern, uniform or random point patterns, or a combination thereof using any of the techniques known in the art for applying such adhesives, including for example extruding, spraying, blowing, rolling, printing and the like. Further, the adhesive may comprise a preformed web of the adhesive composition, and may be applied by positioning the adhesive web between the respective plies to be bonded. In a preferred embodiment, the adhesive agent is supplied in solid form (e.g., gel form), melted, and extruded through a nozzle. After exiting the nozzle, the adhesive agent is entrained with air so that a fine dispersion of the molten adhesive is applied substantially uniformly across the surface of a web of the composite fabric of the invention.

It is important that each adhesive layer be of a very low basis weight, so that it does not significantly alter the flexibility and hand properties of the composite fabric. Preferably, each adhesive layer has a basis weight of less than 5 gsm (gram per square meter), more desirably from about 0.25 to 2 gsm, and most desirably less than 0.5 gsm. When applied by the preferred spraying method described above, the adhesive layer 12 forms a very light, wispy, gossamer web of adhesive which can hardly be seen in the fabric, but which provides excellent inter-ply adhesion.

After the respective plies of the composite nonwoven fabric have been assembled, pressure is applied to the fabric, for example by passing the fabric through cooperating pressure rolls, to press the plies into intimate contact for good inter-ply adhesion. The fabric may also be embossed, if desired, through the use of textured or patterned rolls, to impart a desired surface texture and to improve or alter the tactile qualities of the composite fabric. The pattern of the embossing rolls may be any of those known in the art, including spot patterns, helical patterns, and the like. The embossing may be in continuous or discontinuous patterns, uniform or random points or a combination thereof, all as are well known in the art. Preferably, the embossing rolls are heated so that the thermoplastic adhesive layer 12 can more effectively penetrate and bond the plies together. As will be appreciated by those skilled in the art, the use of heated embossing rolls may result in some minor degree of thermal lamination of the composite nonwoven fabric of the invention due to partial fusion or melting of the polymer of one or mere of the plies. However, the fabric is primarily bonded using the adhesive described above, and any thermal fusion bonding that may occur is minimal so that the barrier properties of the fabric remain intact. Preferably, the embossing is carried out at a temperature below the melting temperature of the lowest melting fibrous component of the web, and desirably also at a temperature above the melting or activation temperature of the adhesive.

While a three-ply composite fabric has been shown in the drawings, it is to be understood that there may be two, three, or more similar or dissimilar plies depending upon the particular properties sought for the laminate. The composite may be used in a surgical item, such as, for example, a surgical drape or a surgical gown, or in disposable personal care products, such as, for example, diapers and sanitary napkins.

Figure 2:
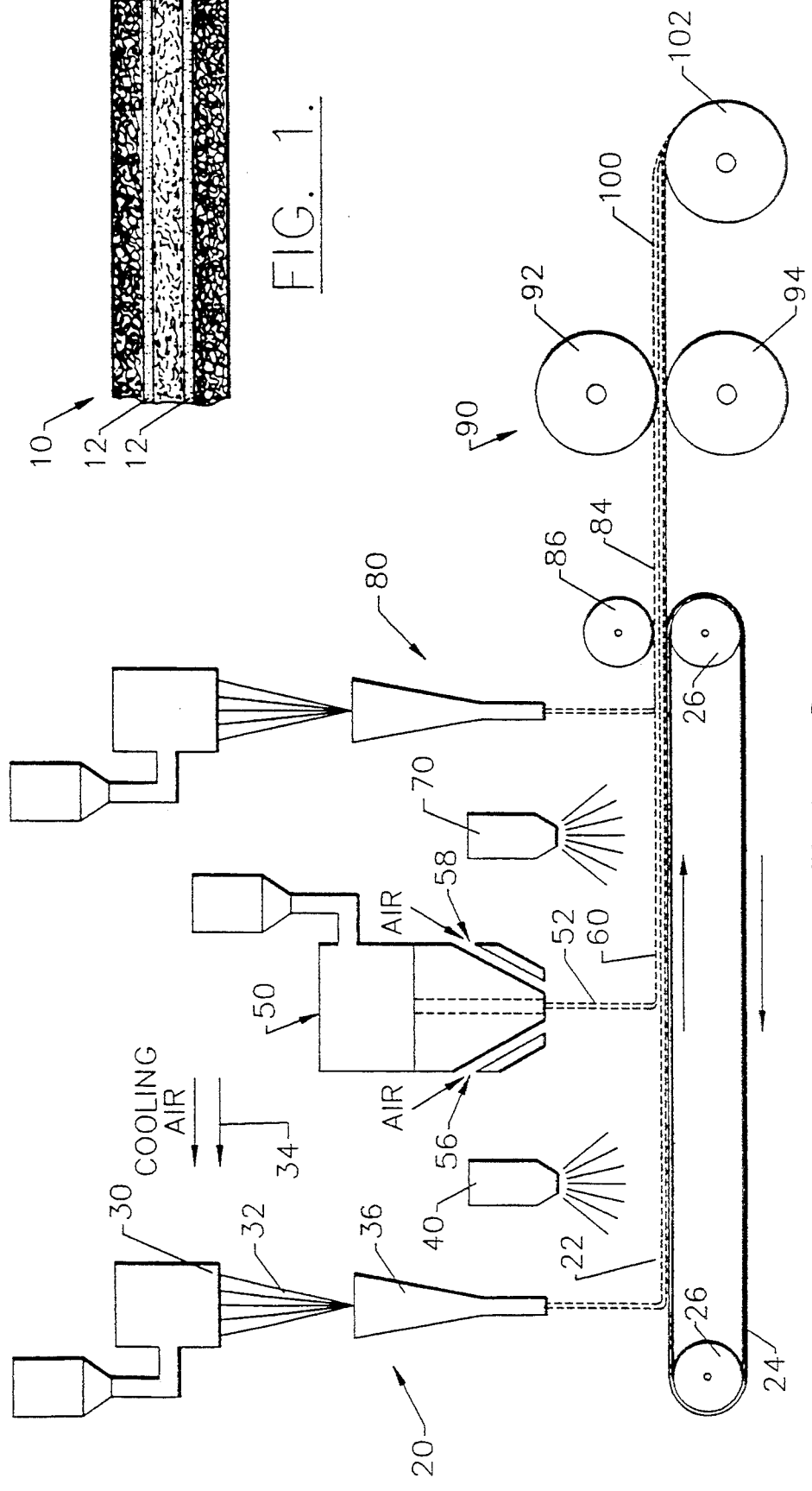
FIG. 2 schematically illustrates one method embodiment for forming a composite nonwoven fabric of the invention.

FIG. 2 schematically illustrates one method for forming a composite nonwoven fabric of the invention. A conventional spunbonding apparatus 20 forms a first spunbonded layer 22 of substantially continuous thermoplastic polymer filaments. Web 22 is deposited onto forming screen 24 which is driven in a longitudinal direction by rolls 26.

The spunbonding process involves extruding a polymer through a generally linear die head or spinneret 30 for melt spinning substantially continuous filaments 32. The spinneret preferably produces the filaments in substantially equally spaced arrays and the die orifices are preferably from about 0.002 to about 0.040 inches in diameter.

As shown in FIG. 2, the substantially continuous filaments 32 are extruded from the spinneret 30 and quenched by a supply of cooling air 34. The filaments are directed to an attenuator 36 after they are quenched, and a supply of attenuation air is admitted therein. Although separate quench and attenuation zones are shown in the drawing, it will be apparent to the skilled artisan that the filaments can exit the spinneret 30 directly into the attenuator 36 where the filaments can be quenched, either by the supply of attenuation air or by a separate supply of quench air.

The attenuation air may be directed into the attenuator 36 by an air supply above the entrance end, by a vacuum located below a forming wire or by the use of eductors integrally formed in the attenuator. The air proceeds down the attenuator 36, which narrows in width in the direction away from the spinneret 30, creating a venturi effect and causing filament attenuation. The air and filaments exit the attenuator 36, and the filaments are collected on the collection screen 24. The attenuator 36 used in the spunbonding process may be of any suitable type known in the art, such as a slot draw apparatus or a tubetype (Lurgi) apparatus.

After the spunbonded layer 22 is deposited onto screen 24, the web passes beneath an apparatus 40 which deposits a substantially uniform coating of an adhesive along the upper surface of the spunbonded layer 22. The apparatus 40 may be any of the devices known in the art for applying a substantially uniform coating of an adhesive agent. Preferably apparatus 40 is a device wherein the adhesive agent is melted, extruded, and entrained with air to form a fine dispersion of adhesive across the surface of the web.

After the adhesive agent is applied to the surface of the spunbonded web 22, the web moves longitudinally beneath a conventional meltblowing apparatus 50. Meltblowing apparatus 50 forms a meltblown fibrous stream 52 which is deposited on the coating of the adhesive agent on the surface of the spunbonded web 22 to form a meltblown fibrous layer. Meltblowing processes and apparatus are known to the skilled artisan and are disclosed, for example, in U.S. Pat. No. 3,849,241 to Buntin, et al. and U.S. Pat. No. 4,048,364 to Harding, et al. The meltblowing process involves extruding a molten polymeric material through fine capillaries into fine filamentary streams. The filamentary streams exit the meltblowing spinneret face where they encounter converging streams of high velocity heated gas, typically air, supplied from nozzles 56 and 58. The converging streams of high velocity heated gas attenuate the polymer streams and break the attenuated streams into meltblown microfibers.

A spunbonded web/meltblown web structure 60 is thus formed. The structure 60 is next conveyed by forming screen 24 in the longitudinal direction beneath an apparatus 70 to apply a coating of an adhesive to the surface of the composite a structure 60. Similar to apparatus 40 described above, apparatus 70 can be any device known in the art for applying an adhesive agent to the surface of a layer. Preferably, the adhesive agent is applied in a substantially uniform coating along the surface of the composite structure 70 as described above.

The composite structure having the second adhesive coating along the upper surface thereof is then conveyed by forming screen 24 in the longitudinal direction to a point where a nonwoven web of thermoplastic strands is formed on the surface thereof. The nonwoven web of thermoplastic strands may comprise a second spunbonded layer formed by a second conventional spunbonding apparatus 80. The spunbonding apparatus 80 deposits a spunbonded nonwoven layer onto the adhesive coated composite structure 60 to thereby form a composite structure 84 consisting of a spunbonded web/meltblown web/spunbonded web. The composite fabric 84 is thereafter directed through a suitable pressure nip, such as is defined between roll 86 and the downstream wire guide roll 26, to press the layers together for good inter-ply adhesion.

Optionally, and as shown in FIG. 2, the composite web 84 is conveyed to a embossing station 90, which comprises cooperating rolls 92 and 94. The embossing rolls 92 and 94 may be point rolls, helical rolls, or the like. Because of the wide variety of fiber compositions which can be used in the fabrics of the invention, embossing conditions, including the temperature and pressure of the rolls, vary according to the particular fiber used, and are known in the art for the differing fiber compositions. For example, for a composite comprising a nylon spunbonded web/LLDPE meltblown web/nylon spunbonded web, the embossing rolls are heated to a temperature of about 35° C. to 140° C., and more preferably between about 60° and 85° C. The composite is fed through the embossing rolls at a speed of about 3 to 300 meters per minute, and preferably from about 5 to 150 meters per minute. The resultant composite web 100 exits the embossing station 90 and is wound up by conventional means on roll 102.

The method illustrated in FIG. 2 is susceptible to numerous variations. For example, although the schematic illustration of FIG. 2 has been described as forming a spunbonded web directly during an in-line continuous process, it will be apparent that the spunbonded webs can be preformed and supplied as rolls of preformed webs. Similarly, although the meltblown web 52 is shown as being formed directly on the spunbonded web 22, and the spunbonded or carded web 82 thereon, meltblown webs and spunbonded or carded webs can be preformed and such preformed webs can be combined to form the composite fabric, or can be passed through heating rolls for further consolidation and thereafter passed on to a spunbonded web or can be stored in roll form and fed from a preformed roll onto the spunbonded layer 22. Similarly, the three-layer web 84 can be formed and stored prior to embossing at embossing station 90.

Although the method illustrated in FIG. 2 employs a meltblown web sandwiched between two spunbonded webs, or between a spunbonded web and a carded web, it will be apparent that different numbers and arrangements of webs can be employed in the invention. For example, the composite nonwoven fabric of the invention may comprise a spunbonded/meltblown web composite. Additionally, several meltblown layers can be employed in the invention and/or greater numbers of other fibrous webs can be used. Nonwoven webs other than carded webs are also advantageously employed in the nonwoven fabrics of the invention. Nonwoven staple webs can be formed by air laying, garnetting, and similar processes known in the art. Thus, for example, a composite fabric can be formed according to the invention by forming a spunbonded web/meltblown web/carded web laminate; a carded web/spunbonded web/meltblown web/carded web laminate; a spunbonded web/meltblown web/spunbonded web/carded web laminate; a carded web/spunbonded web/meltblown web/spunbonded web/carded web laminate, or the like.

Additionally, the polymers used in the present invention may be specifically engineered to provide or improve a desired property in the composite. For example, any one of a variety of adhesion-promoting, or "tackifying," agents, such as ethylene vinyl acetate copolymers, may be added to the polymers used in the production of any of the webs of the composite structure, to improve inter-ply adhesion. Further, at least one of the outer webs may be treated with a treatment agent to render any one of a number of desired properties to the fabric, such as flame retardancy, hydrophilic properties, and the like.

Additionally, the fibers or filaments used in any of the webs of the composite structure may comprise a polymer blend or bicomponent polymeric structure. For example, in one embodiment of the invention, fibers employed in the carded web can be sheath/core or similar bicomponent fibers wherein at least one component of the fiber is polyethylene. The bicomponent fibers can provide improved aesthetics such as hand and softness based on the surface component of the bicomponent fibers, while providing improved strength, tear resistance and the like due to the stronger core component of the fiber. Preferred bicomponent fibers include polyolefin/polyester sheath/core fibers such as a polyethylene/polyethylene terephthalate sheath core fiber.

The invention, including the composite fabrics and methods of forming the same, provides a variety of desirable characteristics in a composite nonwoven fabric, including improved barrier properties and stability against gamma radiation.

The following examples serve to illustrate the invention but are not intended to be limitations thereon.

EXAMPLE 1

A composite nonwoven fabric according to the invention was prepared as described below. A nonwoven web was formed of spunbonded nylon sold under the trademark PBN II by Fiberweb North America. The spunbonded web of substantially continuous nylon filaments has a basis weight of 17 grams per square meter (0.5 ounces per square yard). A second nonwoven web was prepared by meltblowing a 150 melt index linear low density polyethylene to give a fibrous web having a basis weight of 26 grams per square meter. The meltblown web included 3% blue dye. A third nonwoven web was of spunbonded nylon like that described above. A synthetic rubber-based hot melt pressure sensitive adhesive was sprayed at an add-on of about 0.4 gsm to one surface of each spunbonded web and the webs were combined and pressed together to form a nylon spunbonded/polyethylene meltblown/nylon spunbonded composite fabric. The composite fabric was thereafter passed through the nip of a cooperating pair of textured and smooth embossing rolls at 6 meters per minute to impart an embossed pattern to the composite fabric. The rolls were heated to about 70°–72° C.

Samples of the thus produced composite fabric were subjected to gamma irradiation at 2.5 and 8.0 megarad (Mrad). The irradiated samples were aged for two weeks and were then subjected to physical testing along with a nonirradiated control. The results of the test are set forth below in Table 1.

TABLE 1

PROPERTIES OF TRILAMINATE FABRICS
(Before and After Irradiation)

|  | Before Irradiation | Irradiated 2.5 Mrad. | Irradiated 8.0 Mrad. |
|---|---|---|---|
| Basis Weight (oz/sq yd) | 1.67 | 2.05 | 1.99 |
| Grab Tensile (lb) | | | |
| MD | 35 | 38 | 33 |
| CD | 19 | 19 | 17 |
| Elmendorf Tear (g) | | | |
| MD | 768 | 666 | 628 |
| CD | 1295 | 1036 | 1046 |
| Mullen Burst (psi) | 25 | 30 | 28 |
| Impact Penetration (g) | 0.09 | 0.12 | 0.12 |
| Hydrostatic Head (cm) | 39 | 37 | 40 |

EXAMPLE 2

A second composite fabric according to another embodiment of the invention was prepared as follows. A nylon spunbonded web and a polyethylene meltblown web were prepared as described above. A carded web was formed of bicomponent staple fibers having a polyester core and a polyethylene sheath and having a hydrophilic finish. The layers were laminated using a spray adhesive as in Example 1 to provide a nylon spunbonded/polyethylene meltblown/nylon bicomponent carded composite fabric. The composite webs were passed between embossing rolls at 6 meters per minute. The roll temperature was 86° C. to 87° C.

The resulting composite fabric provided good aesthetic and tactile properties. The fabric was also characterized by having different absorbency properties on opposite surfaces, with the nylon spunbonded surface of the composite fabric having hydrophobic properties, and the opposite surface formed from the carded staple fibers having hydrophobic properties. Further, the fabric was stable after gamma irradiation. Thus the invention provides a fabric having unique capabilities in a single fabric.

The invention has been described in considerable detail with reference to its preferred embodiments. However, it will be apparent that numerous variations and modifications can be made without departure from the spirit and scope of the invention as described in the foregoing detailed specification and defined in the appended claims.

That which is claimed is:

1. A gamma radiation sterilizable composite nonwoven fabric comprising:
   a first nonwoven web formed of spunbonded substantially continuous filaments stable to gamma radiation sterilization;
   a second nonwoven web formed of substantially continuous filaments or staple fibers stable to gamma radiation sterilization;
   a third nonwoven web of meltblown microfibers sandwiched between said first and second nonwoven webs, said meltblown microfibers also being formed of a thermoplastic polymer composition stable to gamma radiation sterilization; and
   an adhesive layer in the form of aliqht weight gossamer web having a basis weight of less than about 5 grams per square meter disposed between said first and third nonwoven webs and between said second and third nonwoven webs and adhering the respective nonwoven webs together to form a composite nonwoven fabric.

2. The composite nonwoven fabric according to claim 1 wherein said adhesive layer is a hot melt adhesive having a melting temperature below the melting temperature of said nonwoven webs.

3. The composite nonwoven fabric according to claim 2 wherein said hot melt adhesive comprises a composition selected from the group consisting of styrene-isoprene block copolymers, styrene-butadiene block copolymers, acrylic esters, and polyolefin-based copolymers.

4. The composite nonwoven fabric according to claim 1 wherein each adhesive layer has a basis weight of less than 0.5 gram per square meter.

5. The composite nonwoven fabric according to claim 1 wherein said spunbonded filaments of said first nonwoven web and said substantially continuous filaments or staple fibers of said second nonwoven web are formed from a thermoplastic polymer selected from the group consisting of polyesters, polyamides, copolymers thereof, and blends thereof.

6. The composite nonwoven fabric according to claim 1 wherein said spunbonded filaments of said first nonwoven web are formed from a thermoplastic polymer having hydrophobic properties and said second nonwoven web is a carded web comprising staple fibers having hydrophilic properties.

7. The composite nonwoven web according to claim 1 wherein said meltblown microfibers of said third nonwoven web are formed from a thermoplastic polyolefin composition stable to gamma radiation.

8. The composite nonwoven web according to claim 1 wherein said meltblown microfibers of said third nonwoven web comprise linear low density polyethylene having a melting point of about 125° C.

9. The composite nonwoven web according to claim 1 wherein said second nonwoven web comprises bicomponent fibers.

10. The composite nonwoven web according to claim 9 wherein said bicomponent fibers have a polyester core and a polyethylene sheath.

11. A gamma radiation sterilizable composite nonwoven fabric comprising:
    a first nonwoven web of spunbonded substantially continuous polyamide filaments;
    a second nonwoven web of polyamide substantially continuous filaments or staple fibers;
    a third nonwoven web of polyethylene meltblown microfibers sandwiched between said first and second nonwoven webs; and
    a hot melt pressure sensitive adhesive selected from the group consisting of styrene-isoprene block copolymers, styrene-butadiene block copolymers, acrylic esters, and polyolefin-based copolymers disposed between said first and third nonwoven webs and between said second and third nonwoven webs and adhering the respective nonwoven webs together to form a unitary composite nonwoven fabric stable to gamma radiation, wherein said pressure sensitive adhesive is in the form of a fine gossamer web having a basis weight of less than 5 grams per square meter.

12. The composite nonwoven web according to claim 11 wherein said hot melt adhesive is a pressure sensitive adhesive which is tacky at room temperature.

13. A gamma radiation sterilizable composite nonwoven fabric comprising:
    first and second spunbonded nonwoven webs of substantially continuous polyamide filaments forming the outer surfaces of the composite nonwoven fabric;

a third nonwoven web of meltblown polyethylene microfibers sandwiched between said first and second nonwoven webs; and adhesive layers disposed respectively between said first and third webs and between said second and third webs and bonding the respective webs together to form a unitary composite nonwoven fabric, said adhesive layers each comprising a hot melt adhesive, and each of said adhesive layers being in the form of a lightweight gossamer web having a basis weight of less than five grams per square meter.

14. The composite nonwoven web according to claim 13 wherein said hot melt adhesive comprises a pressure sensitive adhesive which is tacky at room temperature.

15. The composite nonwoven fabric according to claim 14 wherein said hot melt adhesive is selected from the group consisting of styrene-isoprene block copolymers, styrene-butadiene block copolymers, acrylic esters, and polyolefin-based copolymers.

16. A gamma radiation sterilizable composite nonwoven fabric comprising:

a first nonwoven web of spunbonded substantially continuous filaments of a hydrophobic thermoplastic polymer composition stable to gamma radiation;

a second nonwoven web of hydrophilic staple fibers stable to gamma radiation;

a third nonwoven web of polyethylene meltblown microfibers sandwiched between said first and second nonwoven webs; and a hot melt adhesive selected from the group consisting of styrene-isoprene block copolymers, styrene-butadiene block copolymers, acrylic esters, and polyolefin-based copolymers disposed between said first and third nonwoven webs and between said second and third nonwoven webs and adhering the respective nonwoven webs together to form a unitary composite nonwoven fabric stable to gamma radiation, said adhesive being in the form of a light weight gossamer web having a basis weight of less than 5 grams per square meter.

17. A gamma radiation sterilizable composite nonwoven fabric comprising:

a nonwoven web of spunbonded substantially continuous polyamide filaments;

a nonwoven web of polyamide strands;

a nonwoven web of polyethylene meltblown microfibers sandwiched between said nonwoven web of spunbonded polyamide filaments and said nonwoven web of polyamide strands; and an adhesive having a basis weight of less than about 5 grams per square meter disposed between said nonwoven web of spunbonded polyamide filaments and said nonwoven web of meltblown microfibers and between said nonwoven web of polyamide strands and said nonwoven web of meltblown microfibers, said adhesive being in the form of a lightweight gossamer web, and adhering the respective nonwoven webs together to form a composite nonwoven fabric which is stable to gamma radiation sterilization.

18. A gamma radiation sterilizable composite nonwoven fabric comprising:

a nonwoven web of spunbonded substantially continuous polyamide filaments;

a nonwoven web of polyethylene meltblown microfibers bonded to said nonwoven web of spunbonded polyamide filaments;

a hot melt pressure sensitive adhesive disposed between said nonwoven web of spunbonded polyamide filaments and said nonwoven web of polyethylene meltblown microfibers in the form of a lightweight gossamer web having a basis weight of less than 5 gram per square meter, said adhesive bonding said webs to one another to form a composite nonwoven fabric which is stable to gamma radiation sterilization.

* * * * *